Patented Apr. 11, 1933

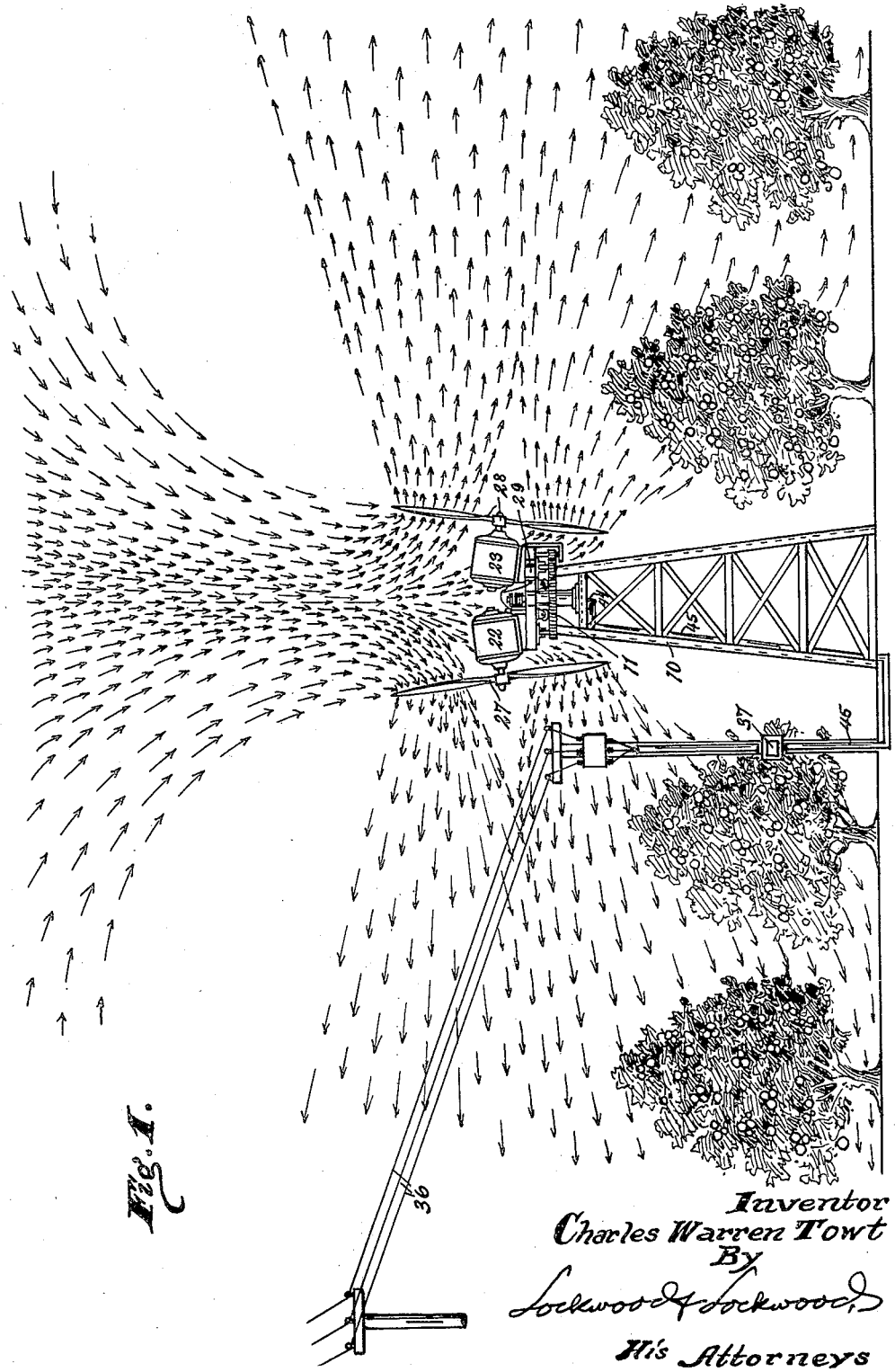

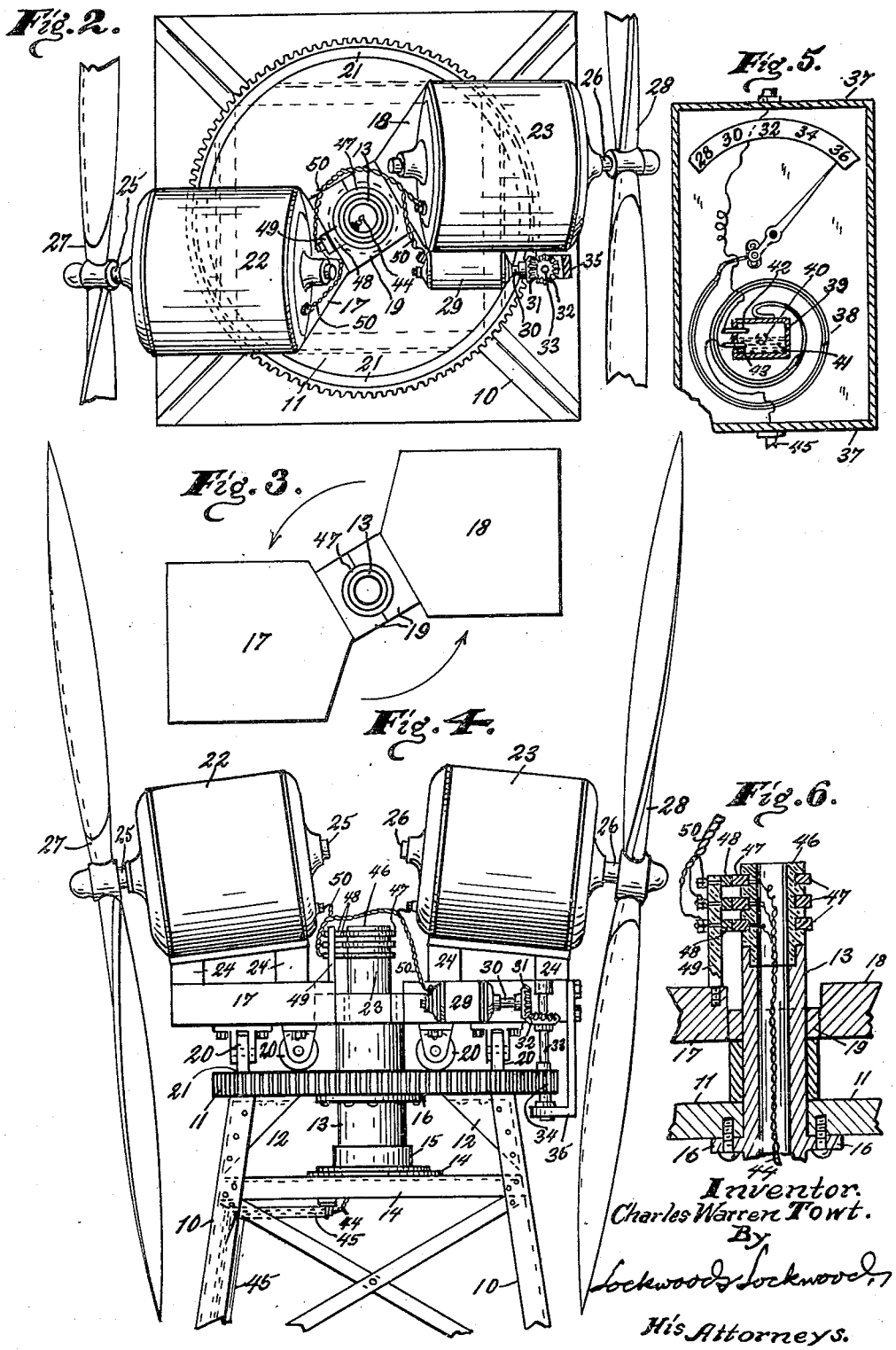

1,903,615

UNITED STATES PATENT OFFICE

CHARLES WARREN TOWT, OF LINDSAY, CALIFORNIA, ASSIGNOR TO CHARLES WARREN TOWT AND DONALD GALE TOWT, AS TRUSTEES OF THE CHARLES WARREN TOWT HOLDING COMPANY, A COMMON-LAW TRUST OF CALIFORNIA

APPARATUS FOR PREVENTING FROST DAMAGE TO VEGETATION

Application filed March 9, 1932. Serial No. 597,713.

This invention relates to an apparatus for preventing frost from damaging vegetation such as orchards and the like, and is an improvement of the apparatus shown and described in my prior application for U. S. Letters Patent for a similar apparatus, Serial Number 469,407, filed July 21, 1930, now Patent 1,848,398, issued March 8, 1932. The principal object of this invention is to provide an apparatus that will more effectively and in a greater volume draw the warmer, drier air from a relatively high strata and drive it down into and through the orchard, garden or the like to displace the low strata of moist air and prevent it from depositing the moisture on the flowers, fruit or foliage, thereby preventing the moisture from freezing on the vegetation at frosting temperature.

To that end I provide a tower that can be located in a central or suitable place in an orchard or garden on the top of which I arrange two relatively large propellers that are rotated in a circle around the tower and driven to draw the drier, warmer air from a high strata and drive it downward and through the orchard or garden, as stated. This movement of the air causes the moist strata of air adjacent the ground to be displaced so its moisture cannot settle on the vegetation in the form of dew, which upon freezing, causes great damage.

Experience has shown that vegetation of all kinds will survive relatively low temperatures if kept dry and an object of this invention is to supply an apparatus for displacing moist air by drawing drier air into the area.

A feature of invention is shown in the construction, combination and arrangement of parts of the apparatus whereby it operates to draw down the higher strata of drier air in the form of an imaginary funnel with its small end centered between the revolving propellers. These propellers are arranged off center to the central vertical axis of the tower and are driven at great speed so that in addition to driving the warmer air downward and outwardly through the orchard or garden for a long distance in all radial directions from the tower, they also cause the platform on which they are mounted to automatically revolve to carry the propellers in a circle, as stated.

Other objects, advantages and features of invention may appear from the accompanying drawings, the subjoined detailed description and the appended claims.

The accompanying drawings illustrate the invention in which:

Figure 1 is a side view of an apparatus for preventing frost damage to vegetation that is constructed in accordance with this invention, showing it in use in an orchard and with arrows diagrammatically indicating the approximate courses of the drawn and driven air.

Fig. 2 is a fragmental plan view of the apparatus, parts indicated diagrammatically.

Fig. 3 is a diagrammatic plan view of the weighted platform on which the propellers and motors are mounted, showing them arranged off center to the axis of the pivot pipe around which they are rotated.

Fig. 4 is a fragmental side view of the upper end of the tower showing the propellers and means for driving them, and also showing a governor for controlling the rotation of the propellers around the tower.

Fig. 5 is a central vertical section through the housing in which the temperature actuated thermometer is mounted showing one of the contacts of the electric circuit out of circuit and the needle pointed at a non-freezing degree of temperature.

Fig. 6 is a central vertical section through the pivot pipe and associated parts showing how the current is transferred from the line wires to the motors when the circuit through the thermometer control is closed.

The apparatus includes a tower 10 that has a stationary platform 11 secured to its upper end by brackets 12, and extending vertically through this platform is a bearing pipe 13 that has its lower end secured to the tower by cross plates 14 and a collar 15, and another collar 16 secures the pipe to the bottom of a spur gear which forms the stationary platform 11 so as to provide a very rigid structure.

A rotary platform comprising the parts 17, 18 and 19, is supported in a horizontal position above the stationary platform and arranged to rotate on the bearing pipe 13 and caster wheels 20 that are secured to the bottom side of the revolving platform and arranged to travel in the circular track 21 on the top side of the stationary platform.

The parts 17 and 18 are secured to the bearing part 19 by brazing or any other well known way and they are arranged opposite to one another and offset relative to the central vertical axis of the bearing pipe 13.

Electric motors 22 and 23 are secured on their respective platforms 17 and 18 by blocks 24 that are arranged to tilt the extended outer ends of the motor shafts 25 and 26 downward about seven degrees so that the propellers 27 and 28 that are secured to the outer ends of these shafts will also be tilted out of vertical planes.

The propellers are preferably formed with elongated blades so that when revolved at high speed they will displace a large volume of air and drive it with considerable force for some distance from the center of the tower.

The platforms 17 and 18 are offset relative to one another and the center of the pipe 13 so that when the propellers are driven the rotary platform on which they are mounted will be automatically rotated around the bearing pipe 13 so that the air thrusts of the propellers will draw the drier upper strata of air downward and drive it along the ground and outward in all radial directions from the center of the tower.

A small motor 29 is provided for controlling the speed of rotation of the revolving platform. It is mounted on the platform part 18 and has on one end of its shaft 30 a bevel gear 31 that is in driving connection with the toothed peripheral edge of the stationary platform 11 by bevel gear 32, shaft 33 and pinion 34. The shaft 33 and pinion 34 are supported by a bracket 35 that is carried by the platform part 18. These parts are arranged so that the propellers cannot rotate the rotary platform at a greater speed than the pinion 34 is driven by the motor 29. In other words, this motor through the pinion 34 governs the speed at which the rotary platform is rotated; as stated, the platform is rotated by the propellers which are offset from the bearing pipe 13 for that purpose.

The motors 22, 23 and 29 can be supplied with current in any suitable way. For the purpose of illustration, line wires 36 are shown diagrammatically as leading from a source of power not shown to a thermostat control 37 that is operated by freezing temperatures to close the circuit between the source of electric current and motors so that they will be automatically started whenever the temperature approaches a degree of freezing.

The temperature actuated thermostat switch 37 is shown semi-diagrammatically in Fig. 5 and, as seen therein, there is a coil spring 38 that has one end secured to a tilting glass tube 39 pivoted at 40 so it can tilt when the spring 38 contracts or expands by a change of temperature to cause the mercury 41 to close the circuit between the contacts 42 and 43 and start the motors when the temperature approaches a freezing point. The electric current is carried by an insulating cable 44 through the pipe 45 to the top of the tower. Then the cable is extended up through the bearing pipe 13 to an insulation distributor head 46 that is secured in the upper end of the pipe. The distributor head has the rings 47 that engage contacts 48 on the post 49 secured to the revolving platform. The electric current is carried from the contacts 48 to the motors by the cables 50. As stated, when the circuit is closed between the contacts 42 and 43, the motors will all be automatically started to drive the propellers.

The propellers 27 and 28 are tilted out of vertical planes so that the distance between the tips of their blades at their highest point of rotation is much greater than at their lowest point so that when driven at high speed and also rotated around the tower they draw upper strata of air downward in the form of an imaginary funnel and then drive it down and outward in all radial directions from the tower, as stated.

This displacement or circulation of the air causes the warmer drier air to descend and displace the damper colder air adjacent the ground so that its moisture cannot settle on the vegetation in the form of dew that on freezing is highly injurious to fruits, flowers and the like. By keeping the vegetation relatively dry by my air circulating apparatus frost damages are avoided even in relatively low temperatures.

I claim as my invention:

1. Apparatus for preventing frost damages to orchards and like vegetation, including a tower, a pair of oppositely arranged rotary propellers mounted at substantially the same elevation on the upper part of said tower, and similarly inclined with reference to a vertical line between them so that the ends of their propeller blades when in an upper position of rotation will be further from each other than when in the lower position of rotation, and when actuated they will draw the air from above the tower downward in a funnel-shaped course and discharge it outwardly and downwardly into the trees of said orchard, substantially as set forth.

2. Apparatus for preventing frost damage to orchards and like vegetation, including a tower, a spur gear forming a stationary platform thereon, a rotary platform supported on said gear, electric motors mounted on said rotary platform with their shafts extending outward and downward, propellers on said motor shafts with their backs facing inward toward each other and arranged so the ends of their propeller blades when in an upward position of rotation are further apart than when in the lowest position of rotation, and means engaging the teeth of said gear for revolving said propellers and motors around said stationary platform, whereby a low pressure area will be maintained by said propellers between them above the tower and cause air to move from above down into the lower pressure area and be propelled outwardly and downwardly into the trees of said orchard, substantially as set forth.

3. Apparatus for preventing frost damage to orchards and like vegetation, including a tower with an upwardly extending bearing member, a circular platform on said tower concentric with said bearing member, electric propeller motors, means supported by wheels traveling on said platform concentric with said bearing member for supporting said motors with their shafts extending outward and downward, and similar propellers mounted on the outer ends of said motor shafts so that their backs will face each other and their upper edges will be further apart than their lower edges, substantially as set forth.

4. Apparatus for preventing frost damage to orchards and like vegetation, including a tower with an upwardly extending bearing member, a circular platform on said tower concentric with said bearing member, electric propeller motors, means supported by wheels traveling on said platform concentric with said bearing member for supporting said motors with their shafts extending outward and downward, similar propellers mounted on the outer ends of said motor shafts so that their backs will face each other and their upper edges will be further apart than their lower edges, and driven means for regulating the speed at which said motors and propellers are rotated around the central vertical axis of said tower.

5. Apparatus for preventing frost damage to orchards and like vegetation, including a tower with an upwardly extending bearing member, a circular platform on said tower concentric with said bearing member, electric propeller motors, means supported by wheels traveling on said platform concentric with said bearing members for supporting said motors with their shafts extending outward and downward, similar propellers mounted on the outer ends of said motor shafts so that their backs will face each other and their upper edges will be further apart than their lower edges, said platform having peripheral gear teeth, an electric motor mounted on the side of said propeller motor support, and means driven by said last mentioned motor that is in gear with the gear teeth of said support for controlling the speed at which the propellers and propeller motors revolve, substantially as set forth.

6. In an apparatus for preventing frost damage to orchards and like vegetation the combination with a tower, a spur gear thereon in the form of a stationary circular platform, a rotary platform thereon, a motor on said rotary platform, a pinion carried by said rotary platform that is in mesh with the teeth of said spur gear, a driving connection between said pinion and motor whereby said rotary platform is revolved, of other motors on said rotary platform having shafts extended out beyond the periphery of said stationary platform, and propellers secured to said shafts.

7. In an apparatus for preventing frost damage to orchards and like vegetation the combination with a tower, a spur gear thereon in the form of a stationary circular platform, a rotary platform thereon, a motor on said rotary platform, a pinion carried by said rotary platform that is in mesh with the teeth of said spur gear, a driving connection between said pinion and motor whereby said rotary platform is revolved, of other motors on said rotary platform having shafts extended out beyond the periphery of said platform, propellers secured to said shafts, a wiring connection to said motors whereby an electrical current can be supplied for driving them, and a temperature actuated thermostatic switch in said wiring connection arranged to close the circuit between two of its contacts at a predetermined degree of temperature.

In witness whereof, I have hereunto affixed my signature.

CHARLES WARREN TOWT.